(12) United States Patent
Kinoshita

(10) Patent No.: US 7,246,073 B2
(45) Date of Patent: Jul. 17, 2007

(54) SYSTEM FOR AND METHOD OF PERFORMING CORPORATE MILEAGE SERVICE

(75) Inventor: Haruhiko Kinoshita, Tokyo (JP)

(73) Assignee: NEC Corporation, Tokyo (JP)

( * ) Notice: Subject to any disclaimer, the term of this patent is extended or adjusted under 35 U.S.C. 154(b) by 732 days.

(21) Appl. No.: 09/906,995

(22) Filed: Jul. 17, 2001

(65) Prior Publication Data

US 2002/0019742 A1    Feb. 14, 2002

(30) Foreign Application Priority Data

Jul. 24, 2000    (JP)    ............................. 2000-222670

(51) Int. Cl.
*G01C 21/36*    (2006.01)
(52) U.S. Cl. .................. 705/6; 705/5; 705/14; 705/26; 705/27
(58) Field of Classification Search ............ 705/5, 705/6, 26, 27, 14
See application file for complete search history.

(56) References Cited

U.S. PATENT DOCUMENTS

| | | | | |
|---|---|---|---|---|
| 6,327,573 | B1* | 12/2001 | Walker et al. ............. | 705/14 |
| 2001/0016825 | A1* | 8/2001 | Pugliese et al. ............ | 705/5 |
| 2002/0178034 | A1* | 11/2002 | Gardner et al. ............ | 705/5 |

FOREIGN PATENT DOCUMENTS

| | | |
|---|---|---|
| JP | 09-034962 | 2/1997 |
| JP | 11-143977 | 5/1999 |
| JP | 11-215264 | 8/1999 |
| JP | 11-353359 | 12/1999 |
| JP | 2000-132609 | 5/2000 |

OTHER PUBLICATIONS

Deciding Who Will Get Airline Mileage Credits More Companies Claiming Workers' Free Tickets. Jeff Hershberger of The Sentinel Staff. Orlando Sentinel. Orlando, Fla.: Jul. 1, 1985.You do the flying.*

(Continued)

*Primary Examiner*—Yogesh C. Garg
(74) *Attorney, Agent, or Firm*—Katten Muchin Rosenman LLP

(57) ABSTRACT

A corporate mileage performing service system and a corporate mileage service performing method allow a corporation who has borne the expenses of business trips using airplanes to receive miles of a mileage service. The corporate mileage performing system has a boarding acceptance terminal, a boarding reservation terminal, a boarder information database device, a mileage information database device storing attribute information of corporate mileage service members and personal mileage service members and information about accumulated miles earned by the corporate mileage service members and the personal mileage service members, a corporation vs. individual relationship information database device storing information of personal mileage identification numbers of employees of corporations registered for a corporate mileage service. The mileage information database device asks the corporation vs. individual relationship information database device for information as to whether a boarder is an employee of one of the corporations registered for the corporate mileage service. If the boarder is an employee, then earned miles are added to accumulated miles of the corporation.

4 Claims, 7 Drawing Sheets

OTHER PUBLICATIONS

You do the flying. but company buys bonus miles. Tampa Tribune. Tampa, Fla.: Dec. 12, 1995.*

Frequent flier programs take off. Morris D. Rosenberg. Chicago Sun—Times. Chicago, Ill.: Sep. 21, 1986.*

JAL, ANA court U.S. Corps. David Jones. Business Travel News. San Fransico: Jun. 26, 2000 vol. 17, Iss. 14.*

Business travel—corporate plans; JAL develops bonus program that companies can bank on. Helen Brower. Travel weekly. Mar. 31, 1985.*

JAL flier plan awards mileage credits to firm. Travel Weekly. Jan. 17, 1985.*

Knight-Ridder Newspapers Press release; Firms shown way to tap frequent-flier bonanza; Chicago Tribune; Chicago, ILL; Jul. 31, 1988; extracted from Proquest database on Feb. 13, 2006 on Internet.*

Asahi Shimbun Company, "Free Airline Tickets for Flight Miles: Mix-Up of Corporate and Private? Corporate Confusion, Even Prohibition of Private Use" Asahi Shimbun, Tokyo Morning Edition Japan, Jul. 22, 1998, p. 21.

Nikkan Kogyo Shimbun Company, "Ever-Growing Mileage Service: an Avoidable Race for Survival" Distribution Service Newspaper, Nov. 17, 1998, p. 1.

Maruyama, et al., "Proposals for the Effective use of Mileage Service: Roping in Heavy Users" Nikkei Multimedia, Japan: Feb. 15, 1999, No. 44 pp. 146-149.

Wada, "United Airlines 'Mileage Plus'," Cardwave Japan, C-Media Co., LTD., vol. 13, No. 1 Dec. 10, 1999, pp. 40-44.

"Betting on a Quick, Decisive Battle in the Scramble for Mileage Program Members: ANA'S CTI Internet-Ready System" Computopia, Japan, Computer Age Co., LTD., Aug. 1, 1997 vol. 32, No. 371, pp. 56-57.

* cited by examiner

SYSTEM FOR AND METHOD OF PERFORMING CORPORATE MILEAGE SERVICE

BACKGROUND OF THE INVENTION

1. Field of the Invention

The present invention relates to a system for and a method of performing a corporate mileage service, and more particularly to a system for and a method of performing a corporate mileage service to distribute miles earned when a corporate employee uses a mileage-related service, e.g., an airplane, for the corporate business. More particularly, the present invention is concerned with a system (hereinafter also referred to as "corporate mileage performing system") for and a method (hereinafter also referred to as "corporate mileage performing method") of performing a corporate mileage service in an environment where each corporate employee can individually make a reservation for boarding an airplane or the like via a network such as the Internet.

2. Description of the Related Art

The widespread use of the Internet allows a corporate employee to make a reservation for boarding an airplane in a boarding reservation acceptance homepage provided by an airline company, without using an authorized travel agent, when the employee makes a business trip for the corporate business. When making such a reservation, the employee enters his or her mileage registration number to get miles of his or her own which are earned.

One conventional mileage service performing system will be described below with reference to FIG. 1 of the accompanying drawings. FIG. 1 shows in block form the conventional mileage performing system.

As shown in FIG. 1, the conventional mileage service performing system comprises reservation terminal 201, boarding acceptance terminal 202, boarder information database device 203, and mileage information database device 204 which are connected to each other by network 206.

Operation of the conventional mileage service performing system will be described below. FIG. 2 is a flowchart of a sequence of operation of the conventional mileage performing system shown in FIG. 1.

As shown in FIG. 2, a corporate employee who wants to make a business trip using an airplane for the corporate business accesses a boarding reservation acceptance homepage provided by an airline company from reservation terminal 201, e.g., an Internet-connectable computer used by the employee. The employee makes a reservation for boarding an airplane and enters his or her own personal mileage identification number in the homepage. Boarding reservation information including the personal mileage identification number is transmitted to boarder information database device 203 in step 301.

Based on the received boarding reservation information, boarder information database device 203 asks for customer attributes of the employee. transmits returned customer attributes to reservation terminal 201 (referencing customer attributes), and stores the customer attributes and the boarding reservation information in combination in step 302.

When the employee checks in at a check-in counter in the airport, the clerk at the check-in counter uses boarding acceptance terminal 202 to transmit boarding acceptance information including a boarding history or boarding details to boarder information database device 203 in step 303.

Based on the received boarding acceptance information, boarder information database device 203 reflects the boarding history in a boarder information database, and transmits the boarding acceptance information to mileage information database device 204. Mileage information database device 204 returns a confirmation signal acknowledging the receipt of the boarding acceptance information to boarder information database device 203 in step 304.

Based on the received boarding acceptance information, boarder information database device 203 adds miles for the present boarding session to accumulated miles for the employee in step 305.

Upon request, mileage information database device 204 provides an article and a service based on certain accumulated miles to the employee, and then subtracts the miles corresponding to the article and the service which have been provided from the accumulated miles for the employee in step 306.

The above conventional mileage service performing system suffers from the following problems:

The first problem is that while the corporation for which the employee works bears the expenses of the business trip, the employee who makes the business trip acquires the miles earned by boarding the airplane.

The reason for the first problem is that in the conventional mileage service performing system, the earned miles belong to the boarder itself, and there is no means for giving the earned miles to the corporation which bears the boarding expenses.

The second problem is that partiality is created among the employees of the corporation.

The reason for the second problem is that employees who make business trips using airplanes enjoy the benefits of the mileage service, whereas other employees do not.

The third problem is that willful employees tend to plan a business trip using an airplane for the purpose of earning miles rather than business purposes.

The reason for the third problem is that miles earned by using an airplane belong to the employee who makes a business trip, rather than the corporation for which the employee works.

SUMMARY OF THE INVENTION

It is therefore an object of the present invention to provide a system for and a method of performing a corporate mileage service to allow a corporation which has borne the expenses of an airplane trip (hereinafter referred to as "mileage-related service") covered by a mileage service to enjoy the mileage service which is given upon request depending on accumulated miles.

To achieve the above object, a corporate mileage service performing system according to the present invention has a boarding acceptance terminal, a boarding reservation terminal, a boarder information database device storing boarding reservation information and boarding history information, a mileage information database device storing attribute information of corporate mileage service members and individual mileage service members and information of accumulated miles earned by the corporate mileage service members and the individual mileage service members, and a corporation vs. individual relationship information database device storing in combination information of corporations and information of individuals belonging to the corporations. The present invention also provides a corporate mileage service performing system having a means for selecting whether usage of a mileage-related service is for the business of a corporation or for private purpose. Furthermore, the present invention provides a corporate mileage service performing system having a means for determining whether usage of a mileage-related service is for the business of a corporation or for private purpose, based on working information.

With the above corporate mileage service performing systems, corporate mileage service members are registered in advance, and when an employee (constituent member) belonging to a corporation which is one of the registered corporate mileage service members uses a mileage-related service such as airplane boarding, the earned miles can be given to the corporation. If the employee uses the mileage-related service for the business of the corporation, then the earned miles are given to the corporation. If the employee uses the mileage-related service for private use, then the earned miles are given to the employee. Furthermore, miles earned by a plurality of employees belonging to a corporation are totaled under the name of the corporation, thus reducing the sum of fractional miles, i.e., miles that do not reach a given mileage point and will be discarded upon elapse of a certain effective period.

The corporate mileage service performing systems according to the present invention are effective to prevent willful corporation employees from making business trips for the purpose of earning miles. Therefore, the expenses paid by corporations for business trips are reduced. Since the corporate mileage service performing systems allow corporations to receive the benefits of a mileage service, the income of the corporations is increased. After a corporation receives earned miles for its all employees, it may distribute the received miles among those employees who do not make business trips.

Corporations referred to herein include corporations established under laws and also bodies of constituent members established for the purpose of performing certain businesses or objectives. A mileage-related service referred to herein means a service which allows a user to earn miles (mileage points) when the user reserves the service, uses the service, or pays a consideration therefor. A mileage service referred to herein means a service that is given from an airline company to a mileage service member depending on accumulated miles earned by the mileage service member upon request from the mileage service member.

The above and other objects, features, and advantages of the present invention will become apparent from the following description with reference to the accompanying drawings which illustrate examples of the present invention.

DESCRIPTION OF THE PREFERRED EMBODIMENTS

Figure 1:
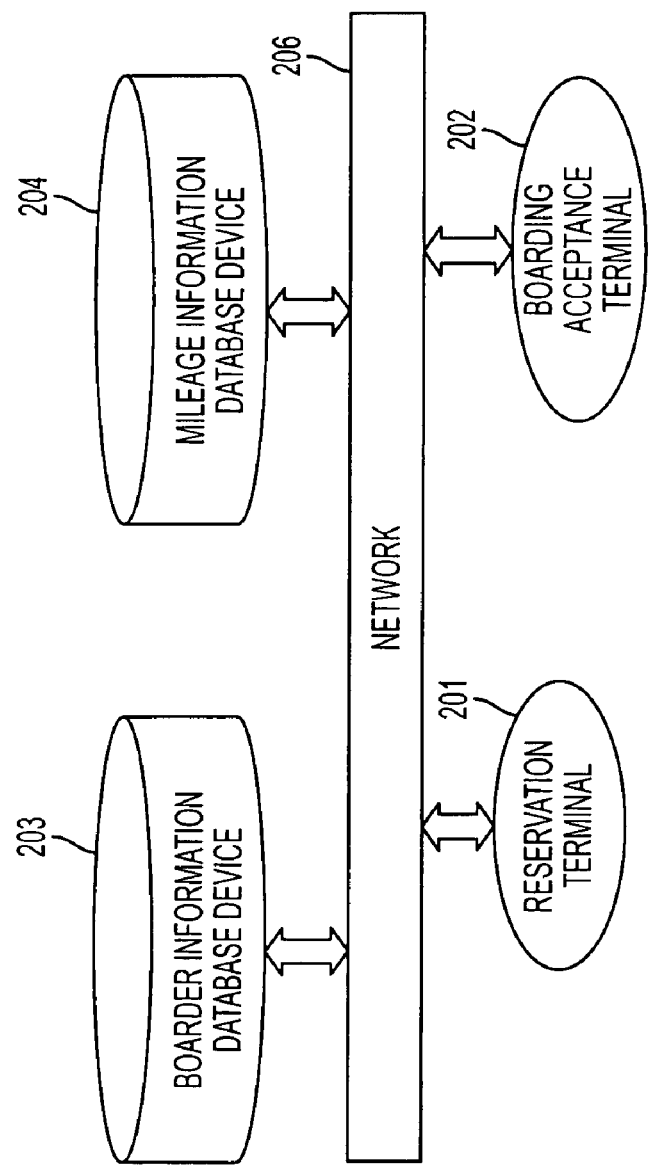
FIG. 1 is a block diagram of a conventional mileage performing system.
Figure 2:
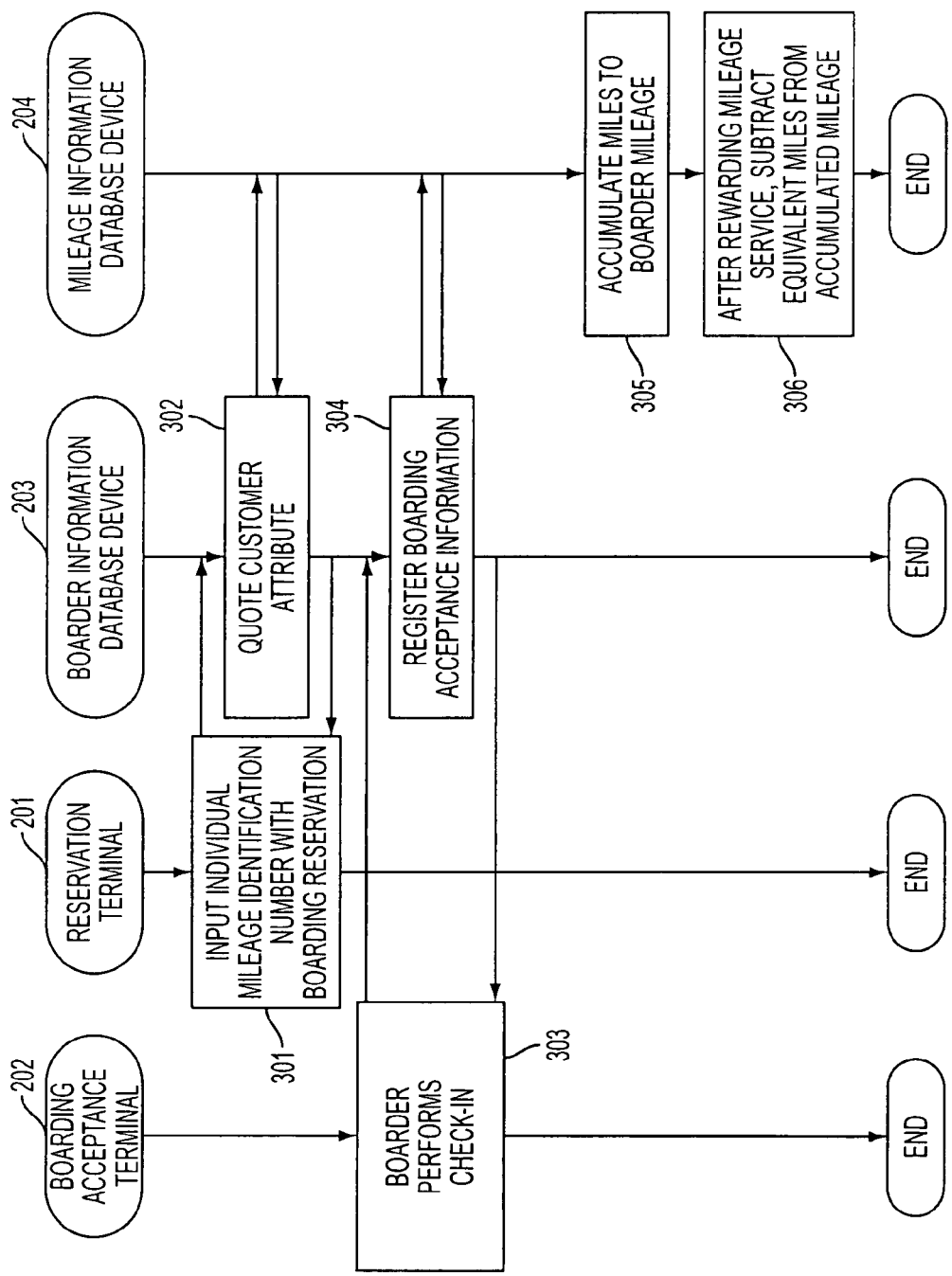
FIG. 2 is a flowchart of an operation sequence of the conventional mileage performing system.

Preferred embodiments of the present invention will briefly be described below.

A corporate mileage service performing system according to a preferred embodiment of the present invention has a reservation terminal for reserving a mileage-related service, an acceptance terminal for accepting a mileage-related service, a usage information database device for storing usage information of a mileage-related service, a mileage information database device for storing accumulated miles information, and means for selecting whether the use of a mileage-related service is for the business of a corporation or for private purpose. The corporate mileage service performing system is preferable for both corporations and employees because it can differentiate and total miles earned by business trips and private trips.

A corporate mileage service performing system according to another preferred embodiment of the present invention has a reservation terminal, an acceptance terminal, a usage information database device, a mileage information database device, means for determining whether a mileage service recipient belongs to a corporation registered for a corporate mileage service, and means for giving miles earned by the mileage service recipient to the corporation if the mileage service recipient belongs to the corporation registered for the corporate mileage service. The corporate mileage service performing system is particularly convenient for those corporations which are constituted of a small number of persons.

A corporate mileage service performing system according to still another preferred embodiment of the present invention has a reservation terminal, an acceptance terminal, a usage information database device, a mileage information database device, a working information database device for storing working information of constituent members of a certain corporation, i.e., a corporation registered for a corporate mileage service, means for determining whether a mileage service recipient belongs to the corporation registered for the corporate mileage service, and means for determining whether the use of a mileage service is for the business of a corporation or for private purpose based on the working information if the mileage service recipient belongs to the corporation registered for the corporate mileage service. The corporate mileage service performing system is preferable for both corporations and employees because it can differentiate and total miles earned by business trips and private trips. The corporate mileage service performing system is particularly convenient for those corporations which manage the working times of employees based on electronic data thereof.

According to yet another preferred embodiment of the present invention, a corporate mileage identification number is assigned to a corporation, and the corporate mileage identification number and a personal mileage identification number are assigned to a constituent member of the corporation. The reservation terminal transmits either one of the corporate mileage identification number and the personal mileage identification number depending on the selection as to whether the mileage-related service is reserved for the business of the corporation or for private purpose.

According to still yet another preferred embodiment of the present invention, the acceptance terminal such as a boarding acceptance terminal has, as with the reservation terminal, means for selecting whether the use of the mileage-related service or the payment of a consideration is for the business of the corporation or not, and means for transmitting the selection to the usage information database device.

According to a further preferred embodiment of the present invention, a corporation vs. individual relationship information database device stores a table of associated information of corporate mileage service members and individual mileage service members whose earned miles are to be given to the corporate mileage service members.

A corporate mileage service performing method according to a preferred embodiment of the present invention has the steps of asking a corporation vs. individual relationship information database for information as to whether a boarder is a constituent member of a corporation registered for a corporate mileage service or not, using a personal mileage identification number as a retrieval key, and, if the boarder is a constituent member of the corporation registered for the corporate mileage service, subtracting miles earned by a boarding session from accumulated miles of the boarder, adding the subtracted miles to accumulated miles of the corporation, and reflecting the subtracted and added miles in a mileage information database.

A corporate mileage service performing method according to another preferred embodiment of the present invention has the steps of, when a mileage-related service is reserved or used by a constituent member of a corporation, determining whether the reservation or use of the mileage-related service is for the business of the corporation or not, based on whether the constituent member has reserved or used the mileage-related service using either a mileage identification number of the corporation or an individual identification number, or based on comparison between the working status of the constituent member and the date of reserving or using the mileage-related service.

Specific preferred embodiments of the present invention will be described below with reference to the drawings.

Figure 3:
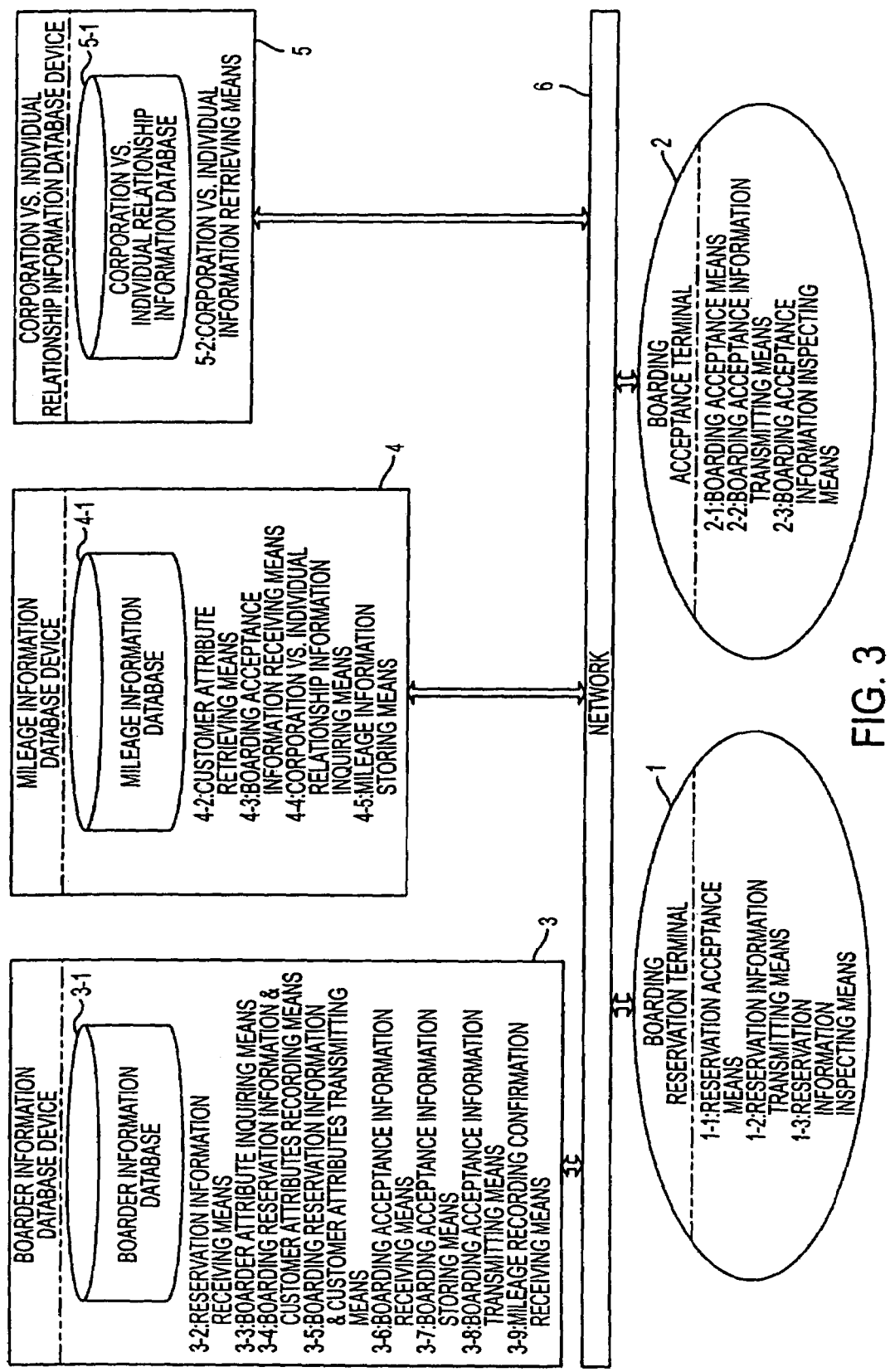
FIG. 3 is a block diagram of a corporate mileage performing system according to a first embodiment of the present invention.

A corporate mileage performing system according to a first embodiment of the present invention will be described below with reference to FIG. 3. FIG. 3 shows in block form the mileage performing system according to the first embodiment of the present invention.

As shown in FIG. 3, the corporate mileage performing system according to the first embodiment of the present invention comprises boarding reservation terminal 1, boarding acceptance terminal 2, boarder information database device 3, mileage information database device 4, and corporation vs. individual relationship information database device 5 which are connected to each other by network (communication link) 6 such as the Internet.

Boarding reservation terminal 1 comprises reservation accepting means 1-1 for accepting a boarding reservation, reservation information transmitting means 1-2 for transmitting reservation information, and boarding reservation information inspecting means 1-3 for letting a customer making a reservation inspect through boarding reservations stored in boarder information database device 3.

Boarding acceptance terminal 2 comprises boarding accepting means 2-1, boarder information transmitting means 2-2 for transmitting boarding acceptance information to boarder information database device 3, and boarding information inspecting means 2-3 for inspecting through boarding data stored in boarder information database device 3.

Boarder information database device 3 comprises boarder information database 3-1, boarding reservation information receiving means 3-2 for receiving boarding reservation information transmitted from boarding reservation terminal 1, boarder attribute inquiring means 3-3 for asking mileage information database device 4 for customer attributes relative to at least miles of the boarding customer based on the received boarding reservation information, boarding reservation information and customer attributes recording means 3-4 for recording boarding reservation information and customer attributes in combination, boarding reservation information and customer attributes transmitting means 3-5 for transmitting (returning) boarding reservation information and customer attributes in combination to boarding reservation terminal 1, boarding acceptance information receiving means 3-6 for receiving boarding acceptance information transmitted from boarding acceptance terminal 2, boarding acceptance information storing means 3-7 for storing boarding acceptance information in boarder information database 3-1, boarding acceptance information transmitting means 3-8 for transmitting boarding acceptance information to mileage information database device 4, and mileage recording confirmation receiving means 3-9 for receiving mileage recording confirmation information returned from mileage information database device 4.

Mileage information database device 4 comprises mileage information database 4-1 storing accumulated miles information and customer attributes, customer attribute retrieving means 4-2 for retrieving customer attributes from mileage information database 4-1 in response to an inquiry about the customer attributes from boarder information database device 3, and transmitting the retrieved customer attributes to boarder information database device 3, boarding acceptance information receiving means 4-3 for receiving boarding acceptance information transmitted from boarder information database device 3, corporation vs. individual relationship information inquiring means 4-4 for asking corporation vs. individual relationship information database device 5 to determine whether a boarder belongs to a corporation or not, i.e., about corporation vs. individual relationship information, and mileage information storing means 4-5 for subtracting miles corresponding to a boarding session from miles earned by the boarder if the boarder belongs to a corporation registered for the mileage service, adding the subtracted miles to the miles of the corporation, and reflecting the results in mileage information database 4-1, based on the corporation vs. individual relationship information transmitted from corporation vs. individual relationship information database device 5. Mileage information storing means 4-5 also has a function to, after the airline company has provided the mileage service depending on the accumulated miles, subtract the miles for the provided mileage service from the accumulated miles of the corporation, and reflect the result in mileage information database 4-1.

Corporation vs. individual relationship information database device 5 comprises corporation vs. individual relationship information database 5-1 storing in combination corporate mileage identification numbers of corporations registered for the mileage service and personal mileage identification numbers of individuals belonging to the corporations, and corporation vs. individual relationship information retrieving means 5-2 for retrieving corporation vs. individual relationship information from corporation vs. individual relationship information database 5-1 in response to an inquiry from mileage information database device 4, and transmitting the retrieved corporation vs. individual relationship information to mileage information database device 4.

Figure 4:
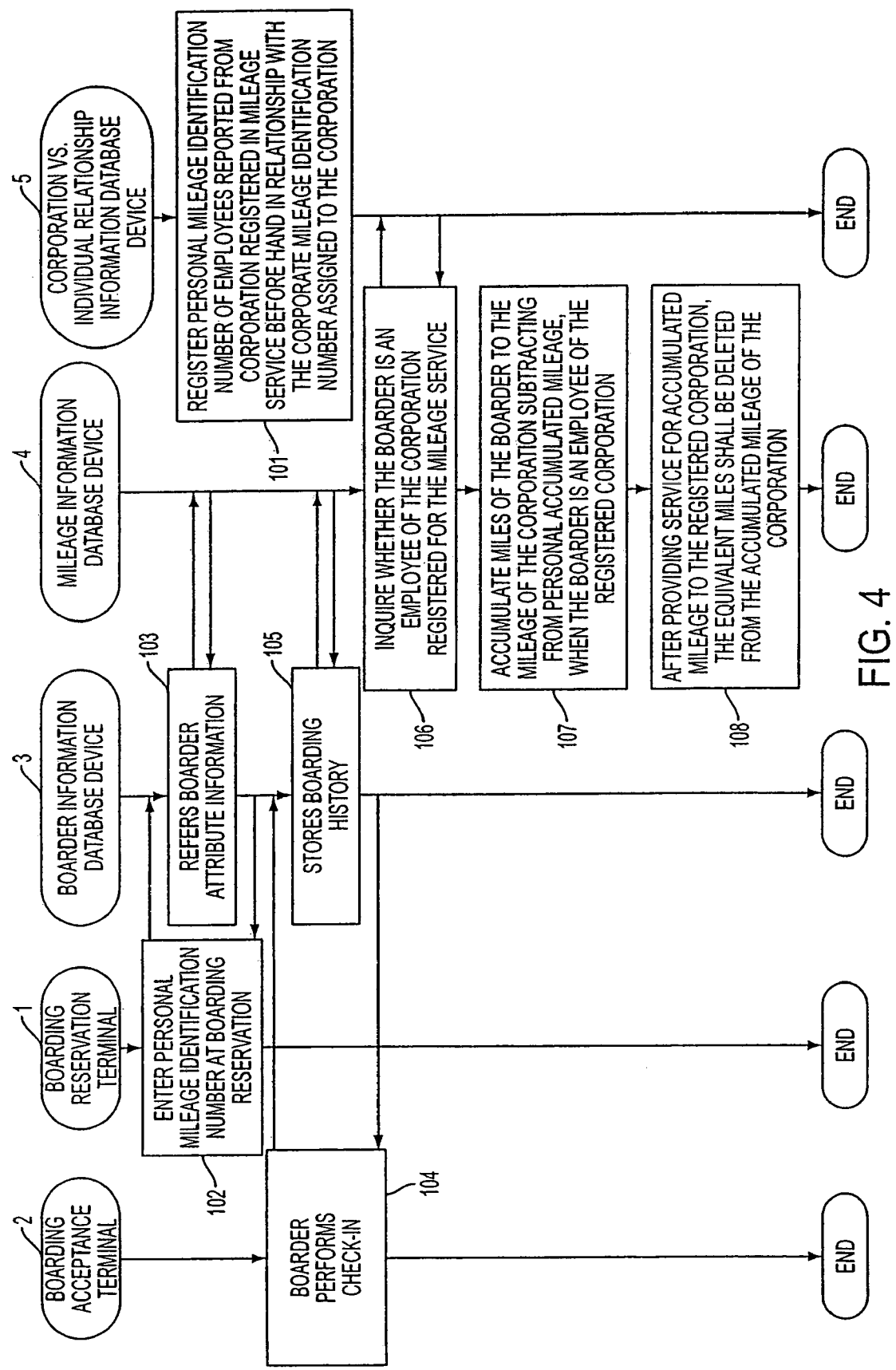
FIG. 4 is a flowchart of an operation sequence of the corporate mileage performing system according to the first embodiment of the present invention.

Operation of the corporate mileage performing system according to the first embodiment of the present invention shown in FIG. 3 will be described below with reference to FIG. 4. FIG. 4 shows an operation sequence of the corporate mileage performing system according to the first embodiment of the present invention.

As shown in FIG. 4, in step 101, a corporation wishing to register itself for a corporate mileage service, i.e., a corporation wishing to obtain miles earned by its employees for boarding airplanes for business trips, applies for the registration with the airline company, collects personal mileage identification numbers of its employees by means of an in-house hearing event or the like, and submits the list of personal mileage identification numbers to the airline company. The airline company stores the corporate mileage identification number assigned to the corporation and the personal mileage identification numbers of the employees of the corporation in combination in corporation vs. individual relationship information database device 5.

In step 102, an employee of the corporation who is planning to make a business trip for the corporate business makes a boarding reservation by entering details including a boarding location, a debarking location, a flight number, a boarding date, a seat rank, etc. on boarding reservation terminal 1, e.g., on a Web page view on the Internet, and transmits the personal mileage identification number to boarder information database device 3. At this time, the employee may make a boarding reservation using the personal mileage identification number.

In step 103, when boarder information database device 3 receives a reservation request from on boarding reservation terminal 1, boarder information database device 3 asks mileage information database device 4 for customer attributes of the customer, e.g., the name, the address, the contact place, the sex, miles of the customer based on received boarding reservation information, etc., of the customer (personal mileage service member), using the received personal mileage identification number as a key. Boarder information database device 3 refers to the returned customer attributes, combines the customer attributes and the reservation information with each other, and transmits them to boarding reservation terminal 1 for the customer to confirm the reservation details.

In step 104, the employee who has made the reservation tells the clerk at the check-in counter in the airport to carry out a boarding process, and the clerk carries out the boarding process (check-in process) using boarding reservation terminal 1. Boarding reservation terminal 1 transmits boarding acceptance information to boarder information database device 3.

In step 105, boarder information database device 3 stores the boarding acceptance information transmitted from boarding reservation terminal 1, and transmits the boarding acceptance information (boarding history information) to mileage information database device 4.

In step 106, based on the received boarding acceptance information, mileage information database device 4 asks corporation vs. individual relationship information database device 5 to ascertain whether the boarder is an employee of one of the corporations registered for the mileage service.

In step 107, if mileage information database device 4 receives information indicating that the boarder is an employee of the registered corporation in response to the inquiry made in step 106, then mileage information database device 4 subtracts miles corresponding to the boarding session from the personal accumulated miles of the boarder and adds the subtracted miles to the accumulated miles of the corporation.

In step 108, the corporation, which is notified from the airline company of the present accumulated miles stored in mileage information database device 4 by mail or the like requests the airline company for an article or service depending on the accumulated miles. After providing the article or service depending on the accumulated miles to the corporation, the airline company subtracts the miles corresponding to the provided article or service from the accumulated miles of the corporation, and reflects the result in mileage information database device 4.

As described above, the mileage performing system according to a first embodiment of the present invention is capable of giving miles earned by using airplanes for business trips to the corporation which has borne the expenses of the business trip, rather than employees who have made the business trips.

Figure 5:
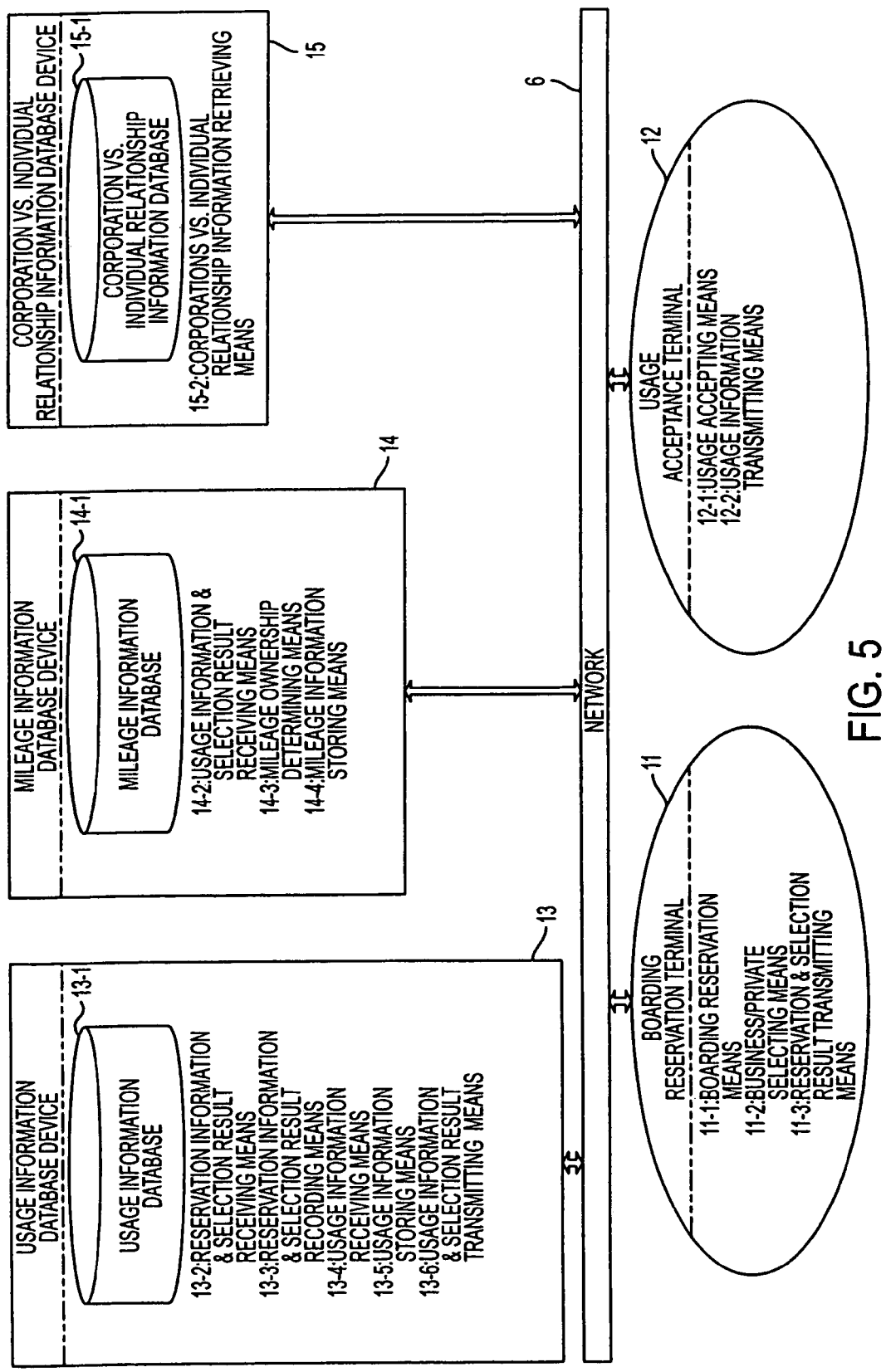
FIG. 5 is a block diagram of a corporate mileage performing system according to a second embodiment of the present invention.

A corporate mileage performing system according to a second embodiment of the present invention will be described below with reference to FIG. 5. FIG. 5 shows in block form the corporate mileage performing system according to the second embodiment of the present invention.

As shown in FIG. 5, the corporate mileage performing system according to the second embodiment of the present invention comprises reservation terminal 11, usage acceptance terminal 12 for accepting the use of a mileage-related service or the payment of a consideration, usage information database device 13, mileage information database device 14, and corporation vs. individual relationship information database device 15 which are connected to each other by network (communication link) 6 such as the Internet.

Reservation terminal 11 comprises reservation accepting means 11-1 for accepting a reservation of the mileage-related service, business/private use selecting means 11-2 for selecting whether a reservation is for the business of a corporation registered for the mileage service or private purpose, and reservation information and selection transmitting means 11-3 for transmitting reservation information including reservation details and the selection to usage information database device 13.

Usage acceptance terminal 12 comprises usage accepting means 12-1 for accepting usage of the mileage-related service or the payment of a consideration, and usage information transmitting means 12-2 for transmitting usage information relative to details of usage of the mileage-related service or the payment of a consideration to usage information database device 13.

Usage information database device 13 comprises usage information database 13-1 storing usage information relative to details of usage of the mileage-related service or the payment of a consideration, reservation information and selection receiving means 13-2 for receiving the reservation information and the selection indicative of whether the usage of the mileage-related service is for business or private purpose, reservation information and selection recording means 13-3, usage information receiving means 13-4 for receiving usage details transmitted from usage acceptance terminal 12, usage information storing means 13-5 for storing usage information including usage details in usage information database 13-1, and usage information and selection transmitting means 13-6 for transmitting the selection and the usage details in combination to mileage information database device 14.

Mileage information database device 14 comprises mileage information database 14-1 storing accumulated miles information, usage information and selection receiving means 14-2 for receiving the usage information and the selection transmitted from usage information database device 13, miles ownership determining means 14-3 for determining whether miles earned by usage of the mileage-related service or the payment of a consideration belongs to a corporation or an individual based on the usage information and the selection which have been received, and mileage information storing means 14-4 for reflecting the earned miles selectively as the accumulated miles of the corporation or the accumulated miles of the individual in mileage information database 14-1 based on the determined result.

Corporation vs. individual relationship information database device 15 comprises corporation vs. individual relationship information database 15-1 storing in combination corporate mileage identification numbers of corporations registered for the mileage service and personal mileage identification numbers of individuals belonging to the corporations, and corporation vs. individual relationship information retrieving means 15-2 for retrieving corporation vs. individual relationship information from corporation vs. individual relationship information database 15-1 in response to an inquiry from mileage information database device 14, and transmitting the retrieved corporation vs. individual relationship information to mileage information database device 14.

Operation of the corporate mileage performing system according to the second embodiment of the present invention will be described below with reference to FIG. 5.

As shown in FIG. 5, corporation vs. individual relationship information database device 15 stores in combination corporate mileage identification numbers of corporations and personal mileage identification numbers of individuals belonging to the corporations.

When an employee of a corporation who is planning to make a business trip makes a reservation for the mileage-related service on reservation terminal 11, reservation terminal 11 prompts the employee to make a selection as to whether the usage of the mileage-related service is for the business of the corporation or for private purpose. If the usage of the mileage-related service is for the business of the corporation, then the employee enters that information into reservation terminal 11 or enters the corporate mileage identification number into reservation terminal 11. If usage of the mileage-related service is for private purpose, then the employee enters that information into reservation terminal 11 or enters his or her own personal mileage identification number into reservation terminal 11. Reservation terminal 11 transmits the reservation information and the selection to usage information database device 13.

Usage information database device 13 receives and records the reservation information and the selection from reservation terminal 11.

When the employee who has made the reservation uses the reserved mileage-related service or pays a consideration, usage acceptance terminal 12 which has accepted the usage of the mileage-related service or the payment of the consideration transmits usage information representing the usage details to usage information database device 13.

Usage information database device 13 receives and records the usage information transmitted from usage acceptance terminal 12, and transmits the usage information and the selection to mileage information database device 14.

When mileage information database device 14 receives the usage information and the selection transmitted from usage information database device 13, mileage information database device 14 determines whether the earned miles belong to the corporation or the employee, based on the selection. If the selection indicates that the earned miles belong to the corporation, then mileage information database device 14 adds the earned miles to the accumulated miles of the corporation. If the selection indicates that the earned miles belong to the employee, then mileage information database device 14 adds the earned miles to the personal accumulated miles of the employee.

If mileage information database device 14 is unaware of the name of the corporation or the corporate mileage identification number of the corporation or if mileage information database device 14 wants to confirm the name of the corporation or the corporate mileage identification number of the corporation, then mileage information database device 14 can ask corporation vs. individual relationship information database device 15 for the name of the corporation or the corporate mileage identification number of the corporation.

With the corporate mileage performing system according to the second embodiment of the present invention, when an employee belonging to a corporation which is a corporate mileage service member uses a mileage-related service such as airplane boarding for the business of the corporation, the earned miles are given to the corporation, and when the employee uses the mileage-related service for private purpose, the earned miles are given to the employee. The miles are thus distributed based on the selection made by the employee who selectively enters information indicative of whether the usage of the mileage-related service is for business purpose or private purpose.

Figure 6:
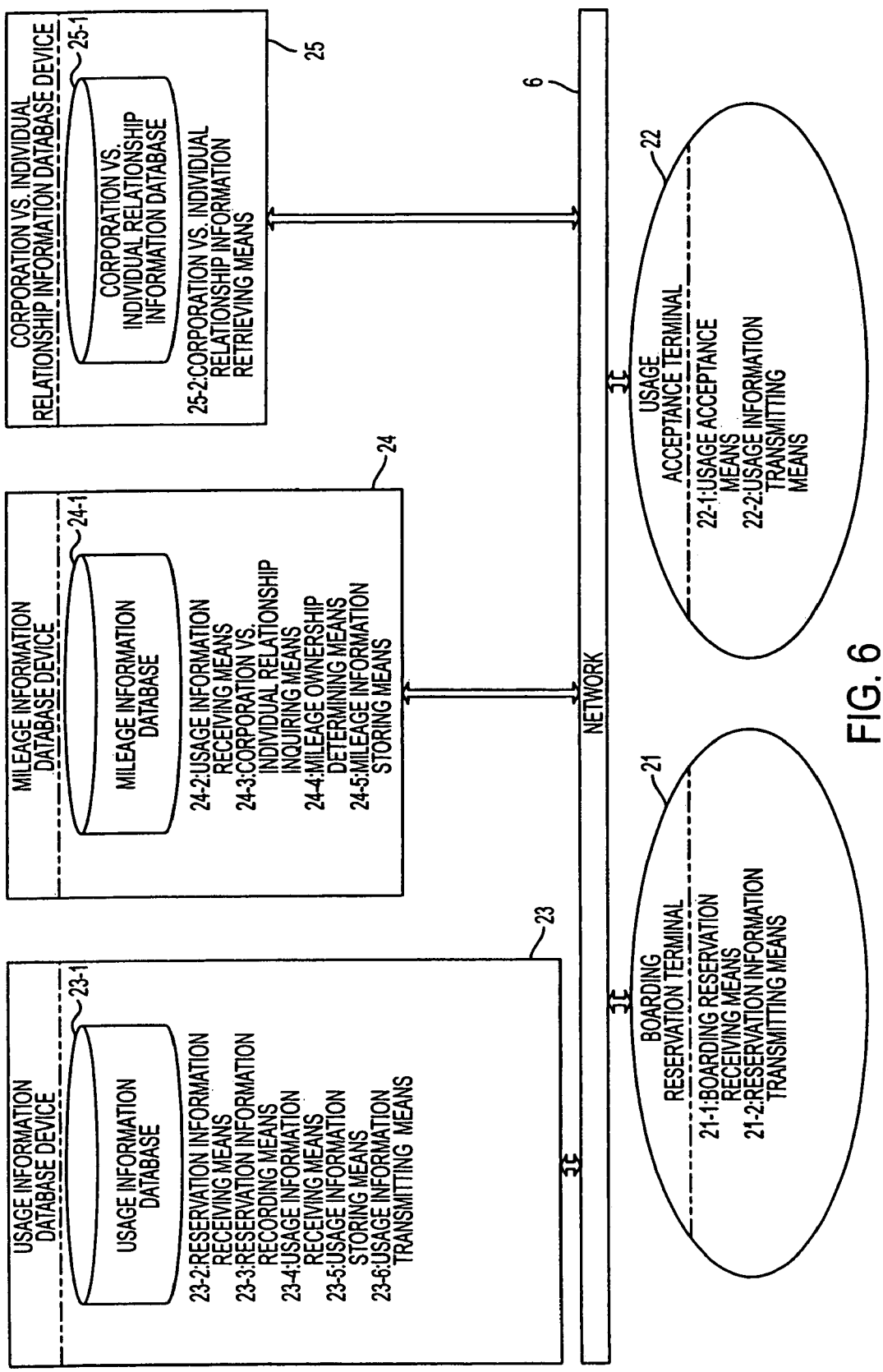
FIG. 6 is a block diagram of a corporate mileage performing system according to a third embodiment of the present invention.

A corporate mileage performing system according to a third embodiment of the present invention will be described below with reference to FIG. 6. FIG. 6 shows in block form the corporate mileage performing system according to the third embodiment of the present invention.

As shown in FIG. 6, the corporate mileage performing system according to the third embodiment of the present invention comprises reservation terminal 21, usage acceptance terminal 22 for accepting the use of a mileage-related service or the payment of a consideration, usage information database device 23, mileage information database device 24, and corporation vs. individual relationship information database device 25 which are connected to each other by network (communication link) 6 such as the Internet.

Reservation terminal 21 comprises reservation receiving means 21-1 for accepting a reservation of the mileage-related service, and reservation information transmitting means 21-2 for transmitting reservation information representing reservation details to usage information database device 23.

Usage acceptance terminal 22 comprises usage accepting means 22-1 for accepting usage of the mileage-related service or the payment of a consideration, and usage information transmitting means 22-2 for transmitting usage information relative to details of usage of the mileage-related service or the payment of a consideration to usage information database device 23.

Usage information database device 23 comprises usage information database 23-1 storing usage information, reservation information receiving means 23-2, reservation information recording means 23-3, usage information receiving means 23-4, usage information storing means 23-5 for storing received usage information in usage information database 23-1, and usage information transmitting means 23-6 for transmitting usage information to mileage information database device 24.

Corporation vs. individual relationship information database device 25 comprises corporation vs. individual relationship information database 25-1 storing in combination corporate mileage identification numbers of corporations registered for the mileage service and personal mileage identification numbers of individuals belonging to the corporations, and corporation vs. individual relationship information retrieving means 25-2 for retrieving corporation vs. individual relationship information from corporation vs. individual relationship information database 25-1 in response to an inquiry from mileage information database device 24, and transmitting the retrieved corporation vs. individual relationship information to mileage information database device 24.

Mileage information database device 24 comprises mileage information database 24-1, usage information receiving means 24-2 for receiving the usage information transmitted from usage information database device 23, corporation vs. individual relationship information inquiring means 24-3 for asking corporation vs. individual relationship information database device 25 for information indicative of whether a mileage service recipient (hereinafter referred to as "mileage recipient") belongs to a certain corporation or not, i.e., corporation vs. individual relationship information, based on the received usage information, miles ownership determining means 24-4 for determining whether miles earned by usage of the mileage-related service or the payment of a consideration belongs to a corporation or an employee based on the usage information and the corporation vs. individual relationship information which have been received, and mileage information storing means 24-5 for storing the earned miles selectively as the accumulated miles of the corporation or the accumulated miles of the employee in mileage information database 24-1 based on the determined result.

Operation of the corporate mileage performing system according to the third embodiment of the present invention will be described below with reference to FIG. 6.

As shown in FIG. 6, corporation vs. individual relationship information database device 25 stores in combination corporate mileage identification numbers of corporations and personal mileage identification numbers of individuals belonging to the corporations.

When an employee of a corporation who is planning to make a business trip makes a reservation for the mileage-related service on reservation terminal 21, reservation terminal 21 transmits reservation information including reservation details to usage information database device 23.

Usage information database device 23 receives and records the reservation information transmitted from reservation terminal 21.

When the employee who has made the reservation uses the reserved mileage-related service or pays a consideration, usage acceptance terminal 22 which has accepted the usage of the mileage-related service or the payment of the consideration transmits usage information representing the usage details to usage information database device 23.

Usage information database device 23 receives and stores the usage information transmitted from usage acceptance terminal 22, and transmits the usage information and the selection to mileage information database device 24.

Mileage information database device 24 asks corporation vs. individual relationship information database device 25 about whether the user (individual) belongs to a corporation registered for the corporate mileage service or not, using the user name or user identification number included in the usage information as a key.

In response to the inquiry from mileage information database device 24, corporation vs. individual relationship information database device 25 checks corporation vs. individual relationship information database 25-1. If the user belongs to a corporation registered for the corporate mileage service, then corporation vs. individual relationship information database device 25 transmits that information and the corporate mileage identification number of the corporation to mileage information database device 24.

Based on the information transmitted from corporation vs. individual relationship information database device 25, mileage information database device 24 determines whether the earned miles belong to the employee or the corporation. If the individual belongs to the corporation registered for the corporate mileage service, then mileage information database device 24 judges that the earned miles belong the corporation, and adds the earned miles to the accumulated miles of the corporation based on the transmitted corporate mileage identification number and the usage information.

With the corporate mileage performing system according to the third embodiment of the present invention, miles earned by a plurality of employees belonging to a corporation are totaled under the name of the corporation, thus reducing the sum of fractional miles, i.e., miles that do not reach a given mileage point and will be discarded upon elapse of a certain effective period.

The corporate mileage performing system according to the third embodiment of the present invention may be arranged such that the mileage information database device is capable of asking the corporation vs. individual relationship information database device for corporation vs. individual relationship information using, as a key, a personal mileage identification number that has been entered into the reservation terminal by an individual.

Figure 7:
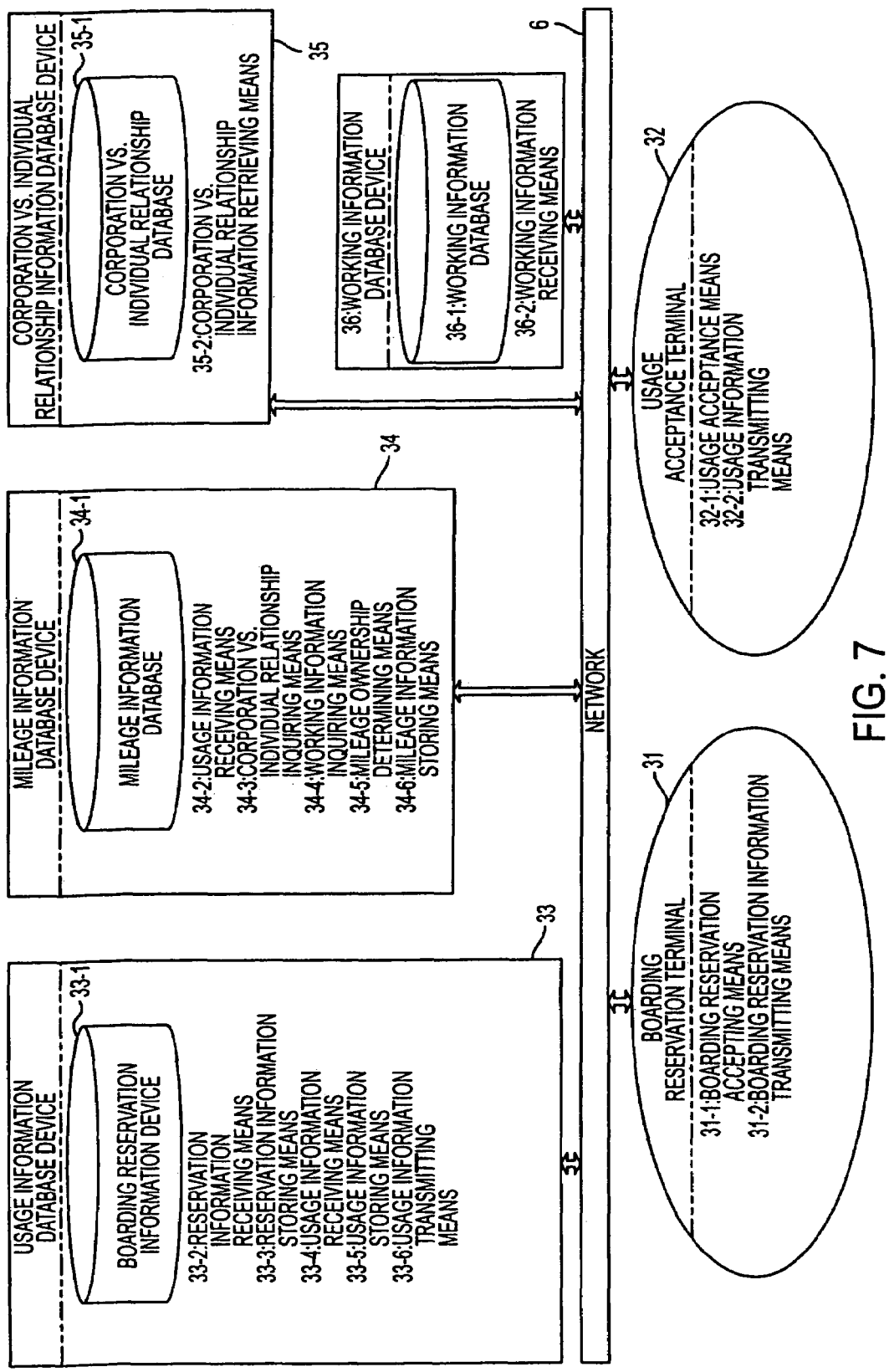
FIG. 7 is a block diagram of a corporate mileage performing system according to a fourth embodiment of the present invention.

A corporate mileage performing system according to a fourth embodiment of the present invention will be described below with reference to FIG. 7. FIG. 7 shows in block form the corporate mileage performing system according to the fourth embodiment of the present invention.

As shown in FIG. 7, the corporate mileage performing system according to the fourth embodiment of the present invention comprises reservation terminal 31 usage acceptance terminal 32 for accepting the use of a mileage-related service or the payment of a consideration, usage information database device 33, mileage information database device 34, corporation vs. individual relationship information database device 35, and working information database device 36 which are connected to each other by network (communication link) 6 such as the Internet.

Reservation terminal 31 comprises reservation accepting means 31-1 for accepting a reservation of the mileage-related service, and reservation information transmitting means 31-2 for transmitting reservation information to usage information database device 33.

Usage acceptance terminal 32 comprises usage accepting means 32-1 for accepting usage of the mileage-related service or the payment of a consideration, and usage information transmitting means 32-2 for transmitting usage information relative to details of usage of the mileage-related service or the payment of a consideration to usage information database device 33.

Usage information database device 33 comprises usage information database 33-1 storing usage information, reservation information receiving means 33-2, reservation information storing means 33-3, usage information receiving means 33-4, usage information storing means 33-5 for storing received usage information in usage information database 33-1, and usage information transmitting means 33-6 for transmitting usage information to mileage information database device 34.

Corporation vs. individual relationship information database device 35 comprises corporation vs. individual relationship information database 35-1 storing in combination corporate mileage identification numbers of corporations registered for the mileage service and personal mileage identification numbers of individuals belonging to the corporations, and corporation vs. individual relationship information retrieving means 35-2 for retrieving corporation vs. individual relationship information from corporation vs. individual relationship information database 35-1 in response to an inquiry from mileage information database device 34, and transmitting the retrieved corporation vs. individual relationship information to mileage information database device 34.

Working information database device 36 comprises working information database 36-1 storing working information of employees or individuals, and working information retrieving means 36-2 for retrieving working information from working information database 36-1 in response to an inquiry about working information.

Mileage information database device 34 comprises mileage information database 34-1, usage information receiving means 34-2 for receiving the usage information transmitted from usage information database device 33, corporation vs. individual relationship information inquiring means 34-3 for asking corporation vs. individual relationship information database device 35 for corporation vs. individual relationship information indicative of whether a mileage service recipient (user) belongs to a certain corporation registered for the mileage service or not, based on the received usage information, working information inquiring means 34-4 for asking working information database device 36 for working information, miles ownership determining means 34-5 for determining whether miles earned by usage of the mileage-related service or the payment of a consideration belongs to a corporation or an individual user based on the corporation vs. individual relationship information and the working information which have been received, and mileage information storing means 34-6 for storing the earned miles selectively as the accumulated miles of the corporation or the accumulated miles of the individual user in mileage information database 34-1 based on the determined result.

Operation of the corporate mileage performing system according to the fourth embodiment of the present invention will be described below with reference to FIG. 7.

As shown in FIG. 7, corporation vs. individual relationship information database device 35 stores in combination corporate mileage identification numbers of corporations and personal mileage identification numbers of individuals belonging to the corporations. Working information database device 36 stores working information of employees or individuals, e.g., information about dates of business trips, destinations of business trips, etc.

When an employee of a corporation who is planning to make a business trip makes a reservation for the mileage-related service on reservation terminal 31, reservation terminal 31 prompts the employee to enter the personal mileage identification number of the employee, and transmits reservation information including the personal mileage identification number and reservation details to usage information database device 33.

Usage information database device 33 receives and records the reservation information including the personal mileage identification number transmitted from reservation terminal 31.

When the employee who has made the reservation uses the reserved mileage-related service or pays a consideration, usage acceptance terminal 32 which has accepted the usage of the mileage-related service or the payment of the consideration transmits usage information representing the usage details to usage information database device 33.

Usage information database device 33 receives and records the usage information transmitted from usage acceptance terminal 32, adds the personal mileage identification number to the usage information, and transmits the usage information to mileage information database device 34.

Mileage information database device 34 asks corporation vs. individual relationship information database device 35 about whether the user (employee) as the mileage service recipient belongs to a corporation registered for the corporate mileage service or not, using the personal mileage identification number transmitted from usage acceptance terminal 32 as a key.

In response to the inquiry from mileage information database device 34, corporation vs. individual relationship information database device 35 checks corporation vs. individual relationship information database 35-1. If the user belongs to a corporation registered for the corporate mileage service, then corporation vs. individual relationship information database device 35 transmits that information and the corporate mileage identification number of the corporation to mileage information database device 34. If the user does not belong to a corporation registered for the corporate mileage service, then corporation vs. individual relationship information database device 35 transmits that information to mileage information database device 34.

If the user belongs to a corporation registered for the corporate mileage service, then mileage information database device 34 asks working information database device 36 for working information of the user (employee), particularly working information on dates when the mileage-related service is used.

In response to the inquiry from mileage information database device 34, working information database device 36 retrieves the working information of the employee (user) on dates when the mileage-related service is used, from working information database 36-1, and transmits the retrieved working information to mileage information database device 34.

Based on the working information transmitted from working information database device 36 and the usage information, mileage information database device 34 determines whether the earned miles belong to the individual employee (user) or the corporation. Specifically, if the working dates and working location are in conformity with the dates and location where the mileage-related service is used, then mileage information database device 34 judges that the earned miles belong the corporation, and adds the earned miles to the accumulated miles of the corporation. If the working dates and working location are not in conformity with the dates and location where the mileage-related service is used, then mileage information database device 34 judges that the earned miles belong to the employee, and adds the earned miles to the accumulated miles of the employee.

If the individual does not belong to a corporation registered for the corporate mileage service, then mileage information database device 34 adds the earned miles to the accumulated miles of the individual.

With the corporate mileage performing system according to the fourth embodiment of the present invention, when an employee of a corporation as a corporate mileage service member uses a mileage-related service such as airplane boarding for the business of the corporation, the earned miles are given to the corporation. When the employee uses the mileage-related service for private purpose, the earned miles are given to the employee.

The present invention offers the following advantages:

The first advantage is that a corporation, which has borne the expenses of a business trip using a mileage-related service such as airplane boarding, can obtain miles earned by the business trip.

The reason for the first advantage is that the miles earned when the business trip is made by an employee of the corporation can be added to the accumulated miles of the corporation.

The second advantage is that there is developed no partiality between those employees of a corporation who often make business trips to earn miles and those employees of the corporation who do not make such business trips.

The reason for the second advantage is that miles earned by activities for the business of the corporation are totaled in the name of the corporation and can be distributed among employees depending on the contributions of those employees.

The third advantage is that it is possible to prevent willful employees from making business trips for the purpose of earning miles.

The reason for the third advantage is that miles earned by activities for the business of the corporation are totaled in the name of the corporation.

The fourth advantage is that it is possible to improve the profits of the corporation and reduce the expenses of the corporation.

The reason for the fourth advantage is that the corporation can become a recipient of the mileage service and the willful incentive for plans to make business trips for the purpose of earning miles can be eliminated.

The fifth advantage is that the possibility or opportunity for a corporation registered for the corporate mileage service of an airline company to have business transactions with the Airline Company is increased.

The reason for the fifth advantage is that since the frequency with which employees of the corporation have boarded airplanes of the airline company is recognized and hence the frequency with which the corporation has used airplanes of the airline company is recognized, the corporation has a greater chance to sell articles and services it provides to airline companies which the corporation has used more frequently than others.

It is to be understood, however, that although the characteristics and advantages of the present invention have been set forth in the foregoing description, the disclosure is illustrative only and changes may be made in the arrangement of the parts within the scope of the appended claims.

What is claimed is:

1. A system for performing a mileage service depending on a distance traveled by a vehicle, comprising:
   a boarding reservation terminal;
   a boarding acceptance terminal;
   a boarder information database device;
   a mileage information database device; and
   a corporation vs. individual relationship information database device;
   wherein each of the devices and terminals is connected to each other device and terminal by a communication link;
   wherein said boarding reservation terminal includes means for accepting a boarding reservation and means for transmitting boarding reservation information;
   wherein said boarding acceptance terminal includes means for accepting a boarding information and means for transmitting boarding acceptance information to said boarder information database device;
   wherein said boarder information database device comprises:
     a boarder information database,
     means for receiving said boarding reservation information transmitted from said boarding reservation terminal,
     means for asking said mileage information database device for customer attributes with respect to at least the mileage service of a boarding customer based on said boarding reservation information,
     means for recording said boarding reservation information and said customer attributes in combination,
     means for returning said boarding reservation information and said customer attributes in combination to said boarding reservation terminal,
     means for receiving said boarding acceptance information transmitted from said boarding acceptance terminal,
     means for storing said boarding acceptance information in said boarder information database, and means for transmitting said boarding acceptance information to said mileage information database device;
   wherein said mileage information database device comprises:
     a mileage information database storing accumulated miles information and said customer attributes,
     means for retrieving said customer attributes from said mileage information database in response to an inquiry about said customer attributes from said boarder information database device,
     means for transmitting the retrieved customer attributes to said boarder information database,
     means for receiving said boarding acceptance information transmitted from said boarder information database device,
     means for asking said corporation vs. individual relationship information database device for corporation vs. individual relationship information indicative of whether said boarding customer is employed by a corporation registered for a corporate mileage service, and
     means for determining whether usage of the vehicle covered by the mileage service is for a business of said corporation registered for the corporate mileage service, based on comparison between a working date and a working location of the employee and a usage date and a location of using the vehicle covered by the mileage service; and
     mileage information storing means adapted to:
       subtract miles included in said boarding information from accumulated miles of said boarding customer if said boarding customer is employed by said corporation registered for the corporate mileage service based on said corporation vs. individual relationship information transmitted from said corporation vs. individual relationship information database device and if said usage of the vehicle is covered by the corporate mileage service for a business of said corporation based on said determining means,
       add the subtracted miles included in said boarding information to miles of the corporation, and
       reflect the result of the subtraction and the addition of the miles included in said boarding information in said mileage information database;

wherein said corporation vs. individual relationship information database device comprises:

a corporation vs. individual relationship information database storing in combination corporate mileage identification numbers of corporations registered for the corporate mileage service and personal mileage identification numbers of individuals employed by the corporations, means for retrieving corporation vs. individual relationship information from said corporation vs. individual relationship information database in response to an inquiry from said mileage information database device, and means for transmitting the retrieved corporation vs. individual relationship information to said mileage information database device.

2. A system for performing a mileage service depending on a distance traveled by vehicle covered by the mileage service, comprising:

a reservation terminal for using the vehicle covered by the mileage service;

an acceptance terminal for using the vehicle covered by the mileage service;

a usage information database device;

a mileage information database device storing accumulated miles information; and a corporation vs. individual relationship information database device;

wherein each of the devices and terminals is connected to each other device and terminal by a communication link;

wherein said reservation terminal comprises:

means for accepting a reservation for using the mileage service, and means for transmitting reservation details to said usage information database device;

wherein said acceptance terminal comprises:

means for accepting usage of a mileage-related service of payment of a consideration to use the vehicle covered by the mileage service, and means for transmitting usage details to said usage information database device;

wherein said usage information database device comprises:

a usage information database storing information of the usage details of the mileage-related service or the payment of the consideration, means for receiving said usage details, means for storing the received usage details in said usage information database, and means for transmitting said usage details to said mileage information database device;

wherein said corporation vs. individual relationship information database device comprises:

a corporation vs. individual relationship information database storing in combination corporate mileage identification numbers of corporations registered for a corporate mileage service and personal mileage identification numbers of individuals employed by the corporations, means for retrieving corporation vs. individual relationship information from said corporation vs. individual relationship information database in response to an inquiry from said mileage information database device, and means for transmitting the retrieved corporation vs. individual relationship information to said mileage information database device;

wherein said mileage information database device comprises:

a mileage information database storing accumulated miles information, means for receiving said usage details transmitted from said usage information database device, means for asking said corporation vs. individual relationship information database for corporation vs. individual relationship information indicative of whether a mileage service recipient is employed by one of the corporations registered for a corporate mileage service or is not employed by one of the corporations registered for a corporate mileage service based on said usage details, means for determining whether miles earned by an employee of said one of the corporations registered for corporate mileage service for the usage of the vehicle covered by the mileage service belong to said one of the corporations registered for a corporate mileage service or the employee, based on said corporation vs. individual relationship information, means for determining whether usage of the vehicle covered by the mileage service is for a business of said one of the corporations registered for a corporate mileage service, based on comparison between a working date and a working location of the employee and a usage date and a location of using the vehicle covered by the mileage service, and means for storing the earned miles selectively as accumulated miles of the corporation or accumulated miles of the employee in said mileage information database, based on the result determined by said both means for determining and said usage details.

3. A system for performing a mileage service depending on a distance traveled by a vehicle covered by the mileage service, comprising:

a reservation terminal for using the vehicle covered by the mileage service;

an acceptance terminal for accepting an application for using the vehicle covered by the mileage service;

a usage information database device;

a mileage information database device storing accumulated miles information;

a corporation vs. individual relationship information database device; and a working information database device;

wherein each of the devices and terminals is connected to each other device and terminal by a communication link;

wherein said reservation terminal comprises:

means for accepting a reservation for a boarding covered by the mileage service, and means for transmitting reservation details to said usage information database device;

wherein said acceptance terminal comprises:

means for accepting usage of the vehicle covered by the mileage service or payment of a consideration to use the vehicle covered by the mileage service, and means for transmitting usage details to said usage information database device;

wherein said usage information database device comprises:

a usage information database storing information of the usage of the vehicle covered by the mileage service or the payment of the consideration, means for receiving said usage details, means for storing the received usage details in said usage information database, and means for transmitting said usage details to said mileage information database device;

wherein said corporation vs. individual relationship information database device comprises:

a corporation vs. individual relationship information database storing in combination corporations registered for a corporate mileage service and personal mileage identification numbers of employees of the corporations, means for retrieving added miles recipient information from said corporation vs. individual relationship information database in response to an inquiry from said mileage information database device for information as to whether an individual as an added miles recipient belongs to one of the corporations registered for the corporate mileage service, and means for transmitting corporation vs. individual relationship information indicative of whether the retrieved added miles recipient is employed by said one of the corporations registered for the corporate mileage service or is not employed by said one of the corporations registered for the corporate mileage service to said mileage information database device;

wherein said working information database device comprises:

a working information database storing working information of the employee, and means for transmitting the working information in response to an inquiry;

wherein said mileage information database device comprises:

a mileage information database storing accumulated miles information, means for asking said corporation vs. individual relationship information database for corporation vs. individual relationship information based on said usage details transmitted from said usage information database device, means for asking said working information database for working information of the employee as the mileage service recipient, means for determining whether miles earned by the usage of the mileage service or the payment of the consideration belong to said one of the corporations registered for the corporate mileage service or the employee as a mileage service recipient, based on said working information and said corporation vs. individual relationship information, means for determining whether usage of the vehicle covered by the mileage service is for a business of said one of the corporations registered for the corporate mileage service, based on comparison between a working date and a working location of the employee and a usage date and a location of using the vehicle covered by the mileage service, and means for storing the earned miles selectively as accumulated miles of the corporation of as accumulated miles of the employee in said mileage information database, based on a result determined by said both means for determining.

4. A method of performing a mileage service depending on a distance traveled by a vehicle, comprising the steps of:

registering in combination corporations registered for a corporate mileage service and personal mileage identification numbers assigned to employees of the corporations in a corporation vs. individual relationship information database;

transmitting the personal mileage identification number assigned to one of the employees of one of the corporations when a boarding reservation is made using a boarding reservation terminal;

transmitting boarding acceptance information including boarding details when a boarding process is carried out for a boarder using a boarding acceptance terminal;

receiving said boarding acceptance information and said personal mileage identification number, adding miles earned by said boarder to accumulated miles of said boarder using said personal mileage identification number as a retrieval key, and asking said corporation vs. individual relationship information database for information as to whether said boarder is an employee of one of the corporations registered for the corporate mileage service, using said personal mileage identification number as a retrieval key;

determining whether usage of the vehicle covered by the mileage service is for a business of said one of the corporations registered for the corporate mileage service, based on comparison between a working date and a working location of the employee and a usage date and a location of using the vehicle covered by the mileage service; and if said boarder is an employee of one of the corporations registered for the corporate mileage service and said usage of the vehicle covered by the mileage service is for a business of said one of the corporations registered for the corporate mileage service, subtracting miles from accumulated miles of said boarder, adding the subtracted miles to accumulated miles of said one of the corporations, and reflecting the subtraction and addition of miles in a mileage information database.

* * * * *